United States Patent
Klos et al.

(10) Patent No.: US 6,432,176 B1
(45) Date of Patent: Aug. 13, 2002

(54) DEVICE FOR STORING COMPRESSED GAS

(75) Inventors: Holger Klos, Karlsruhe; Walter Schütz, Weidenberg, both of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/857,992
(22) PCT Filed: Dec. 2, 1999
(86) PCT No.: PCT/DE99/03916
§ 371 (c)(1),
(2), (4) Date: Jun. 13, 2001
(87) PCT Pub. No.: WO00/39499
PCT Pub. Date: Jul. 6, 2000

(30) Foreign Application Priority Data

Dec. 15, 1998 (DE) .......................... 198 59 654

(51) Int. Cl.[7] ........................... F17C 11/00; B01D 53/04
(52) U.S. Cl. ........................... 96/117.5; 96/126; 96/133; 206/0.7; 502/416
(58) Field of Search ..................... 96/108, 149, 117.5, 96/121, 133, 126; 95/901; 55/523, 527; 206/0.7; 502/416, 428

(56) References Cited

U.S. PATENT DOCUMENTS

| | | | |
|---|---|---|---|
| 4,446,111 A | 5/1984 | Halene et al. | ............... 422/200 |
| 4,667,815 A | 5/1987 | Halene | ............... 206/0.7 |
| 4,964,524 A | 10/1990 | Halene | ............... 220/3 |
| 5,151,251 A * | 9/1992 | Solcia et al. | ............... 422/119 |
| 5,332,426 A * | 7/1994 | Tang et al. | ............... 55/385.3 |
| 5,626,650 A * | 5/1997 | Rodriguez et al. | ............. 95/116 |
| 5,653,951 A * | 8/1997 | Rodriguez et al. | ............. 206/0.7 |
| 5,656,069 A * | 8/1997 | Nikolskaja et al. | ...... 210/502.1 |
| 6,113,673 A * | 9/2000 | Loutfy et al. | ............... 502/416 |
| 6,159,538 A * | 12/2000 | Rodriguez et al. | .......... 420/900 |
| 6,290,753 B1 * | 9/2001 | Maeland et al. | ............. 206/0.7 |
| 6,309,449 B1 * | 10/2001 | Klos et al. | ................ 55/527 |

FOREIGN PATENT DOCUMENTS

| | | |
|---|---|---|
| JP | 2001254897 A * | 9/2001 |
| WO | WO 96/41745 | 12/1996 |
| WO | WO 97/26082 | 7/1997 |

\* cited by examiner

Primary Examiner—David A. Simmons
Assistant Examiner—Frank M. Lawrence
(74) Attorney, Agent, or Firm—Cohen, Pontani, Lieberman & Pavane

(57) ABSTRACT

A closed storage reservoir has at least one feed and discharge line for compressed gas and, in its interior, a gas flow control system which connects the feed and discharge line to a solid filling for storing the compressed gas in the interior. To ensure the highest possible specific storage capacity of the device and to enable the device to be used as a tank system for a fuel cell, the solid filling comprises carbon nanostructures which are joined to form larger, cohesive conglomerates. A device for measuring the filling level of the compressed gas in the storage vessel may be a device for measuring the nuclear magnetic resonance or a device for measuring the mass flow rates of the compressed gas. A temperature sensor and a heating/cooling device having an inlet connection piece and an outlet connection piece for a heating/cooling medium and a cooling passage connected to the connection pieces are provided in order to set a defined temperature in the storage vessel.

30 Claims, 4 Drawing Sheets

DEVICE FOR STORING COMPRESSED GAS

BACKGROUND OF THE INVENTION

1. Field of the Invention

The present invention relates to a device for storing compressed gas, in particular hydrogen, having at least one closed storage vessel which has at least one feed and discharge line for the compressed gas and, in its interior, a gas flow control system, the gas flow control system being connected to the feed and discharge line for the compressed gas, and in which a solid filling for storing the compressed gas is provided in the interior.

The storage of hydrogen in normal pressure vessels presents particularly significant difficulties if the maximum possible filling density based on the vessel volume is to be achieved.

2. Description of the Related Art

U.S. Pat. No. 4,964,524 discloses a device for storing compressed gas as described in the introduction, in which hydride-forming metal alloys form a fine particulate filling, having a storage capacity which is high with respect to the volume. However, this store has significant drawbacks, in particular on account of its high overall weight.

In recent times, there have been proposals to use what are known as carbon nanostructures to store gasses, in particular hydrogen. One such proposal can be found in WO 97/26082. The only statement made with regard to the technical design of storage device is that storage vessel is provided with a hydrogen storage bed. There are no indications as to the filling density of the nanostructure material.

In many applications in which stored hydrogen is to be used, it is imperative that it be possible to store the maximum possible quantity of gas with the smallest possible store volume and a small store weight (highest possible specific storage capacity). This requirement applies in particular to mobile applications, such as for example in hydrogen tanks for vehicles which are operated by fuel cells. Therefore, there is a need to further increase the storage capacity which it has hitherto been possible for storage devices for compressed gases, in particular hydrogen, to reach.

Furthermore, it is imperative, in particular when using storage devices as fuel tanks, for it to be possible to determine the current filling level of the storage device with compressed gas in a simple, inexpensive yet accurate way. The filling of mobile gas tanks is usually determined by determining the weight of the gas tank. With liquefied gas tanks, it is also possible to provide a strain gauge which is secured in linear fashion in the longitudinal direction of the gas tank on the outer wall of the gas tank, this gauge reacting to temperature changes in the region of the liquid level in the gas tank as a result of the formation of cold due to evaporation when the gas is removed, so that the current filling level can be approximately determined visually.

SUMMARY OF THE INVENTION

Working on the basis of the above-mentioned prior art, the invention is based on the object of providing a device for storing compressed gas, i.e. non-liquefied gas, in particular hydrogen, in which the drawbacks described in the prior art are avoided. In particular, the invention is to refine a device of the type described in the introduction in such a manner that its specific storage capacity is significantly increased and, at the same time, it is also possible to accurately determine the current filling quantity of the storage vessel.

This object is achieved by a device for storing compressed gas wherein the solid filling is a filling of carbon nanostructures which are joined to form larger cohesive conglomerates, and wherein at least one device for measuring the filling level of the compressed gas in the storage vessel is provided.

The basic idea of the invention is, inter alia, that the storage capacity for the compressed gas is increased by the solid filling, which comprises carbon nanostructures, in the storage vessel, since more nanostructure material can be introduced into the predetermined storage volume of the storage vessel by the formation of cohesive conglomerates than has hitherto been possible by simply introducing the carbon particles with a nanostructure which were originally produced. At least some of the conglomerates have a significantly higher density (apparent density) than a loose bed of the nanostructure material. The storage device according to the invention can be used for both stationary and mobile applications. In particular, the device according to the invention is suitable for storing gaseous fuels, such as for example hydrogen or the like.

Furthermore, the device for measuring the filling level makes it possible to measure the filling level of the stored medium. The measured filling level values can be presented by means of suitable display means, so that a user is informed in good time of when the storage vessel needs to be topped up with compressed gas.

It is advantageously possible to provide two or more storage vessels. The number of storage vessels used may be varied as desired depending on the particular application and demand. The individual storage vessels may advantageously be connected to one another, so that only a single feed or discharge line is required for the entire storage device.

Advantageously, the storage vessel may be designed as a pressure vessel, in particular as a pressure vessel for storing gases at a pressure of less than or equal to 150 bar. The invention is not restricted to any specific vessel geometries or vessel materials.

The storage vessel may, for example, be substantially cylindrical. A shape of this type is particularly suitable for storing compressed gases at high pressures. However, other vessel geometries are also possible. Particularly when using the storage device as a fuel tank for vehicles, it is not always possible—on account of the installation space available in the vehicle—to use a cylindrical vessel. Therefore, the cross section of the storage vessel may also, for example, be oval-shaped, flat or in the form of a storage cushion. The interior of the storage vessel may, by way of example, without implying any restriction, be circular in cross section.

The storage vessel may be of single-part or multipart design and/or of single-walled or multiwalled design. A specific design of the vessel can be selected individually depending on the particular requirement and application.

The vessel materials used may, for example, be suitable metals. However, it is also conceivable to produce the storage vessel from plastic, which may in particular be fiber-reinforced. The invention is not restricted to particular storage vessel materials. It is only important that the storage vessel overall be suitable for storing compressed gas at an operating pressure of preferably up to 150 bar.

In a further configuration, it is possible in each case to provide a separate feed line and discharge line for the compressed gas. A design of this nature may accelerate the charging and discharging operation of the storage vessel or storage vessels.

Preferably, at least one filter element, preferably a microfilter, is provided in the feed line and/or the discharge line for the compressed gas. A filter of this type reduces the undesirable discharge of particles of the solid filling from the storage vessel. Microfilters of this type preferably consist of hydrogen-resistant materials, for example of gas-permeable inorganic or organic polymer films, ceramic materials, inert gas-permeable sintered steels or the like.

In a further configuration, it is possible to provide a heating/cooling device for the interior of the storage vessel and/or the solid filling situated in the interior and/or the stored compressed gas. A heating/cooling device of this type can be used to set the optimum temperature for absorption during storage and desorption during discharging of the compressed gas in the carbon nanostructures in the storage vessel.

The heating/cooling device may advantageously have an inlet connection piece and/or outlet connection piece formed in the wall of the storage vessel for a heating/cooling medium. In this case, a passage or a line for the heating/cooling medium may be provided at least for heat exchange, the passage or the line being connected to the inlet connection piece and/or the outlet connection piece. Heat or cold can be fed into the storage vessel via a heating/cooling device designed in this manner by means of a suitable heating/cooling medium, for example a gas or a liquid. No particular design of the passage or line is required. For example, the passage or the line may be designed as open or closed systems, such as grooves, tubes or the like. Furthermore, it is possible for the channel or the line to be formed in the region of the vessel wall of the storage vessel. In a case of this type it is possible, for example if the storage vessel is of multi-walled design, for the at least one passage or the line to be formed between the vessel outer wall and the vessel inner wall, as a heating/cooling jacket. As a result, the heating/cooling medium flowing through the passage or the line does not come into contact with the carbon nanostructures situated inside the storage vessel. However, it is also conceivable for the at least one passage or the line of the heating/cooling device to extend through the solid filling. In this case, the passage or the line may, for example, be of star-shaped, helical or any other desired configuration. The invention is not restricted to particular embodiments of the passage or the line. In principle, direct heat exchange is also possible, in particular if a gas which is of the same type as the stored gas is used as heating/cooling medium, as is explained in more detail below.

Preferably, it is possible to provide at least one temperature sensor for measuring the temperature prevailing in the interior of the storage vessel, which sensor is expediently arranged inside the solid filling, but may also be accommodated in a cavity which is not filled by the nanostructure material.

In a further configuration, the solid filling is formed from a number of individual conglomerates of carbon nanostructures. In this way, the individual conglomerates may initially be produced independently of one another and can then be combined to form a finished storage system.

Advantageously, at least some conglomerates are compacted to an apparent density which is higher than the apparent density of the carbon nanostructures which were originally in loose form. In this way, it is possible to store a large quantity of compressed gas with a relatively small storage volume of the storage vessel, since more storage mass is introduced into the predetermined storage volume of the storage vessel than would be possible by simply introducing storage mass. In this context, the term apparent density is understood as meaning the weight with respect to the volume of the conglomerate. It is advantageously possible to increase the apparent density of the conglomerates produced from the particles of carbon nanostructure material which were originally in loose form to at least 1.5 times, preferably at least double the original apparent density. The original apparent density is usually approximately 1.0 g/cm$^3$, so that the desired values during the compaction are preferably minimum densities of 1.5 or 2.0 g/cm$^3$, respectively.

Surprisingly, despite the compaction which has taken place, the storage capacity with respect to the weight of the carbon nanostructure material is retained as far as possible. This leads to the storage capacity based on the volume of the storage device designed according to the invention rising substantially in accordance with the increase in the apparent density of the conglomerates.

Compaction of the carbon nanostructures entails a further significant advantage, which consists in the fact that the individual particles are forcibly held together, so that in this way, when the storage vessel is discharged, undesirable discharge of extremely small particles with the gas flow removed is prevented. This is because the escape of particles into downstream equipment or the environment could under certain circumstances lead to technical problems or be contrary to emission regulations concerning extremely small particles.

The carbon nanostructures are advantageously formed from nanofibers and/or nanotubes and/or nanoshells. Preferably, however, the carbon nanostructures are in the form of nanofibers. This form is dealt with in particular in the text which follows. However, the invention is not restricted to the carbon nanostructures being in the form of nanofibers.

In a further configuration, the carbon nanostructures may have an oriented structure.

In a preferred configuration, the carbon nanostructures are of helical design. This helical structure may, for example, be described as being in the form of a "spiral staircase". Therefore, the helical carbon nanofibers initially have an outer structure running in the longitudinal direction, in the form of the helix line and, in addition, an inner structure. This inner structure, which in the exemplary embodiment of the "spiral staircase" would form the individual "steps", comprises individual graphite planes in which the compressed gas, for example the hydrogen, is stored. On account of its large number of edges, a structure of this type has considerable advantages with respect to the storage charging and discharging.

A further advantageous type of carbon nanostructures is constructed in the form of small tubes, preferably with an external diameter of, for example, 35 mm and an internal diameter of, for example, 10 nm, so that the wall thickness is of the order of magnitude of about 10 nm. The inner structure of the fibers has graphite planes which are arranged in a fishbone design. In this case, the graphite planes may be partially connected, in the manner of a bridge, to the opposite side across the inner cavity.

To achieve advantageous storage of compressed gas, the carbon nanostructures may be activated. Activation of this type has the purpose of modifying the surface of the carbon nanostructures in such a way that the compressed gas can then be incorporated in the individual graphite planes of the inner structure. The compressed gas may be incorporated physically or chemically, in a similar form as with metal hydrides. The activation of the carbon nanostructures is advantageously effected by a suitable reaction gas.

As a result of the fact that the carbon nanostructures have an oriented structure, particularly in the case of fiber-like carbon nanostructures, a denser macroscopic structure is achieved. In particular, by suitable ordering, it is possible to minimize spaces between the individual carbon nanostructures, resulting overall in an increase in the apparent density of the carbon nanostructures. Furthermore, it is possible, by ordering of the carbon nanostructures, to control an expansion of the carbon nanostructures which occurs as a result of the charging with compressed gas in a targeted way. While unordered fibers expand, for example, in three dimensions, ordered fibers expand substantially only in one dimension. However, the expansion in only one dimension can easily be taken into account by suitable filling of the storage vessel with the carbon nanostructures.

In a further configuration, the conglomerates are formed by additional pressing of the carbon nanostructures. The pressing ensures mechanical linking of the carbon nanostructures.

Advantageously, the conglomerates of carbon nanostructures may be designed as disk-like bodies. Disk-like bodies of this type can easily be produced, for example by pressing. Furthermore, the individual disks can easily be stacked on top of one another, so that practically the entire storage vessel volume can be filled up. This further increases the specific storage capacity of the storage device.

Depending on requirements, it is also conceivable for the individual disk-like bodies to be spaced apart from one another by suitable spacers. The height of the spacers may, for example, be in the $\mu$m range up to the cm range. This makes it possible for the compressed gas which is fed into the storage vessel via the feed line, in particular the hydrogen, to flow around the conglomerates of carbon nanostructures, which are designed as disk-like bodies, from all sides, leading to improved storage of the compressed gas in the carbon nanostructures. The disk-like bodies may preferably be designed with a basic area which corresponds to the cross section of the vessel. Naturally, as described in more detail below, it is possible for the basic area of the disk-like bodies also to be selected to be smaller.

In a further configuration, the conglomerates may be designed in the form of pellets. These pellets are preferably designed in the form of spheres or tablets, so that they have good flow characteristics when being introduced into the storage vessel. The pellets may be produced, for example, by means of a suitable stamping press or extrusion process. It is advantageously possible to use pellets of different sizes and/or geometries. The result is a particularly high filling density, since the remaining volume which is not filled up by solid bodies inside the storage vessel is minimal.

In a further configuration, the carbon nanostructures may be mounted in a bearing device arranged in the interior of the storage vessel. In this case, the bearing device preferably has a number of compartments. A bearing device of this type has the advantage that it can initially be produced, in a simple and inexpensive manner, in a separate working step. Furthermore, the conglomerates of carbon nanostructures which serve as the solid filling, after they have been produced, can easily be fitted into the bearing device. This overall system comprising bearing device and solid filling may then be introduced into the storage vessel of the storage device as a modular unit without presenting any difficulties.

Advantageously, the compartments of the bearing device are formed by baffle plates which are at a distance from one another in the longitudinal direction of the storage vessel. Baffle plates of this type have a number of advantages. For example, first of all they prevent segregation of the carbon nanostructures with any admixing which is to take place over the compartments delimited by two adjacent baffle plates. Furthermore, in the event of vessels fracturing in the event of an accident, the baffle plates prevent the carbon nanostructures from also being able to be discharged without obstacle together with the compressed gas. Furthermore, the baffle plates may be produced in combination with the conglomerates of carbon nanostructures in the form of dimensionally stable pellets, which are then easy to introduce into the storage vessel. Furthermore, as well as a radially oriented supply or discharge of energy, the baffle plates also promote an axially oriented exchange of energy. Finally, the baffle plates, which may be produced from a gas-carrying and/or gas-permeable material, also facilitate gas transfer in the radial direction, since during discharging operations the carbon nanostructure layers which adjoin the surface of the baffle plates are the layers which are predominantly discharged or charged. Baffle plates of this type are described for a metal hydride store for example in U.S. Pat. No. 4,446,111, the content of disclosure of which is to this extent incorporated in the present description.

In a further configuration, it is possible for in each case two adjacent baffle plates to form the top part and the bottom part of a closed canister. Preferably, the sum of the volumes of the canisters filled with carbon nanostructures in the interior of the storage vessel prior to the initial charging with compressed gas is smaller than the net internal volume of the storage vessel.

The canisters are each completely filled with the conglomerates of carbon nanostructures. In this way, each canister contains the same quantity of carbon nanostructures. Since, moreover, the canisters are closed, very simple and safe handling is possible. These canisters are, for example, substantially in the form of a flattened cylinder, so that they can easily be mounted in the interior of the storage vessel. The canisters preferably have a central aperture, through which, for example, a gas flow control tube of the gas flow control system is guided.

The canisters are advantageously designed in such a way that, when the storage vessel is completely filled with the canisters, the volume of all the canisters which have been introduced in total is smaller than the net internal volume of the storage vessel itself. In this context, the term net internal volume is understood as meaning the internal volume of the storage vessel minus the volume of the gas flow control system and the heating/cooling device which is optionally present. The volume difference should be at least as great as the specific increase in volume of the carbon nanostructure material after it has been charged and discharged a number of times compared to the original uncharged state. This ensures that the carbon nanostructure material in the charged state can expand readily without the storage vessel being damaged.

Preferably, the canister top part and the canister bottom part each have an inner shell and an outer shell, the inner shells and the outer shells engaging over one another at least in regions prior to the initial charging with compressed gas. The design of the canisters makes it possible for them to be deformed as a result of an expansion of the carbon nanostructure material.

In this case, the canisters are advantageously designed in such a way that they keep the carbon nanostructures in disk form enclosed between the canister bottom part and the canister top part even in the deformed state. This prevents uncontrolled accumulation of material within the storage vessel during operation. The canister bottom parts and top parts can be used as suitable heat baffles during the charging and discharging operation. Canisters of this type have already been disclosed in U.S. Pat. No. 4,667,815 in connection with metal hydride stores, so that the content of disclosure of this document is to this extent incorporated in the description of the present invention.

In a further configuration, the carbon nanostructures, in order to form the conglomerates, and/or the conglomerates themselves may be embedded in a gas-permeable matrix. The matrix material used is preferably gas-permeable chamber, pore or embedding systems. For example, embedding in a polymer, for example in styropor is conceivable, ensuring both microscopic binding of the carbon nanostructures and macroscopic incorporation in styropor pores. Gas-permeable binders can also be used as matrix material.

Advantageously, the conglomerates of carbon nanostructures may have a basic area or cross section which is smaller than or the same size as the internal cross section of the storage vessel. In this way it is possible, depending on requirements, to ensure an optimum filling of the storage vessel with carbon nanostructure material. Particularly if the basic area or the cross section of the conglomerates of carbon nanostructures is smaller than the internal cross section of the storage vessel, a gap which can be used as a flow passage for the compressed gas to be stored or alternatively for a heating/cooling medium is formed between the vessel wall and the solid filling of carbon nanostructure material. For this purpose it is possible, for example, for a partial quantity of the stored gas to be guided out of the vessel in a circuit, to be cooled or heated in a heat exchange and then to be returned to the vessel.

In a further configuration, the device for measuring the filling level is designed as a measuring device for measuring the nuclear magnetic resonance of the gas in the storage vessel.

This creates the possibility of measuring the filling level of the stored medium directly. Other than the type of medium stored and the temperature, there is no need for any particular additional knowledge of further values and data relating to the medium, such as pressure or its filling history.

The basic idea of this measuring device consists in measuring the nuclear magnetic resonance (NMR) of the compressed gas in order to determine the filling level. This makes use of the principle that some atomic nuclei, such as for example those of hydrogen, have a nuclear magnetic moment (nuclear spin). This interacts with an external magnetic field. In the case of hydrogen, which is considered in more detail at this point in order to improve understanding by way of example but without restricting the invention to hydrogen, the magnetic moment can establish itself parallel or antiparallel to the applied magnetic field through the external magnetic field. These two options differ in terms of energy, so that two different energy levels exist. These energy levels are differently occupied in thermal equilibrium, meaning that there are more nuclear spins in the lower energy level than in the upper energy level. The quantitative distribution over the two energy levels is dependent only on the type of medium employed and on its temperature. If energy is then supplied to this system in the form of electromagnetic radiation, the quantity of energy supplied corresponding to the difference between the two energy levels, nuclear spins are transferred from the lower energy level to the upper energy level. The result can be recorded and evaluated and transmitted in terms of the actual filling of the storage vessel.

Therefore, by measuring the nuclear magnetic resonance in a partial volume of the storage vessel covered by the measurement, it is possible to extrapolate with regard to the total volume so as to determine the filling level of the compressed gas stored in the storage vessel using the currently prevailing quantity of atomic nuclei of the compressed gas situated in this vessel. This merely requires suitable calibration with regard to the storage volume present in each case so that the measured values determined can each be assigned to specific filling levels.

The measuring device preferably has a measuring head which records a specific partial volume of the storage vessel, which is filled with the compressed gas and the carbon nanostructure material in the same way as the remaining regions of the storage vessel. A static magnetic field and an alternating electromagnetic field are present in the measuring head, the field lines of the static magnetic field and of the alternating electromagnetic field being perpendicular to one another. The static magnetic field is used to set the nuclear spins at their different energy levels. The alternating electromagnetic field, the level of which corresponds to the energy difference between the energy levels, causes nuclear spins to be transferred from the lower energy level to the upper energy level. The energy difference between the energy levels is directly proportional to the alternating electromagnetic field applied. The more nuclear spins there are inside the measuring head, the more energy can be absorbed, so that the absorbed energy is also directly proportional to the number of nuclear spins. Therefore, a measuring device of this type determines and evaluates, as one parameter, a measured value which is representative of the energy absorption caused by nuclear magnetic resonance. The higher the measured value, the higher the filling level of the compressed gas stored in the storage vessel. By suitable calibration, it is possible to assign specific filling levels, based on the storage vessel which is present, for the stored compressed gas to the individual measured values.

In a further configuration, the device for measuring the filling level may be designed as a measuring device for measuring the mass flow rates of the compressed gas. Since the masses of the compressed gas are of interest in particular when using the storage device as a fuel tank in combination with fuel cells, the mass flow rate of the compressed gas can be measured directly by this measuring device, so that errors which could occur, for example, with a pure volumetric flow measurement are avoided. This is because parameters such as temperature, pressure and density also play a role in the case of volumetric flow measurement.

Advantageously, the measuring device for measuring the mass flow rates of the compressed gas may be designed as a measuring device for measuring the thermal energy transfer in a gas flow. Measuring devices of this type are known as anemometers. In these anemometers, heat is supplied to the compressed gas and the corresponding temperature profile is measured. The heat is absorbed by the gas molecules flowing past as molecular vibration. Consequently, the heat which is removed is directly proportional to the number of gas molecules and therefore proportional to the mass. All systems operate thermoresistively. Response times of less than 1 msec are possible when the anemometers are introduced into the flow of the compressed gas. This allows accurate measurement of the mass flow rate and therefore, by guiding a mass balance, also allows the filling level in the storage vessel to be determined. A series of different measurement methods which are based on the anemometry principle are described by way of example below. However, it will be clear that the invention is not restricted to the examples described.

In one embodiment, the measuring device for measuring the mass flow rates may be designed as a calorimeter. In a calorimeter of this type, a heating element is arranged symmetrically between two temperature sensors. When no gas is flowing, a symmetrical temperature profile is formed. Therefore, the temperature difference between the two temperature sensors is zero. The heating element is supplied with current, but after it has reached the desired temperature and no heat is dissipated, the current supply is also set at zero. When compressed gas is flowing through, the heat which has already been provided is dissipated by the flowing compressed gas, and a temperature difference is established between the two temperature sensors. The mass flow rate can be described using the known parameter of the heat supplied, the temperature difference and the heat capacity.

In another configuration, the measuring device for measuring the mass flow rates may be designed as a hot-wire anemometer. The basic principle of the hot wire anemometer is based on removing heat from the heated wire by the compressed gas flowing around it. This leads to cooling and therefore to a change in resistance. This change in resistance is proportional to the mass of medium which has flowed through. The principle of the hot wire anemometer is particularly suitable for constant and known medium temperatures. Therefore, it can be employed particularly advantageously if a separate temperature sensor is also present in the storage vessel of the storage device.

A further example of a suitable measuring device for measuring the mass flow rates is, for example, what is known as a hot film anemometer. In this case, the compressed gas flows around two temperature-sensitive resistors which form part of a bridge circuit. The downstream resistor is heated by the current on account of the resistance ratio selected. The other resistor adopts the gas temperature. The heating current is predetermined by an electrical control unit in such a way that a constant temperature difference is established between the heated resistor and the temperature of the compressed gas. Consequently, in this case too the electrical current is proportional to the mass flowing past.

In a further embodiment, two thermoresistive resistors are brought into contact with the compressed gas. Both are heated. Medium flows around one of these resistors, while the other is situated in an area without flow. The temperature difference is used to measure the mass flow rate.

Furthermore, it is also conceivable for a single thermoresistive resistor to be heated for a specific time and then to be cooled by the compressed gas flowing past. The cooling time can then be used as a measure of the mass flow rate.

The device for measuring the filling level may advantageously be arranged in the interior of the storage vessel and/or in the vicinity of the feed line and/or discharge line and/or in the feed line and/or discharge line itself. It is advantageous to arrange the device for measuring the filling level in the interior of the storage vessel if the filling level measurement is carried out by means of a measuring device for measuring the nuclear magnetic resonance. When using a measuring device for measuring the mass flow rate of the compressed gas, this device is preferably arranged in the feed line and/or the discharge line itself or alternatively in its immediate vicinity.

In a further configuration, the gas flow control system may have one or more gas flow control tubes and/or one or more passages. The compressed gas which is to be stored is conveyed from the feed line into all regions of the interior of the storage vessel through the gas flow control tube or the gas flow control tubes or the passage or the passages, so that it can be stored in the carbon nanostructure material as far as possible simultaneously at numerous locations of the storage vessel interior. Advantageously, the gas flow control system may have gas flow control structures which are machined into the surfaces of the conglomerates of carbon nanostructures and/or penetrate through the conglomerates. Structures of this type may, for example, be protruding webs which serve as spacers between the conglomerates or machined grooves through which the compressed gas can preferentially flow. Furthermore, the gas flow control structures may be designed as formations which pass through the conglomerates, for example as holes or the like, forming flow paths for the gas. If holes of this type are arranged coaxially in succession in the individual conglomerates, it is expediently also possible, through a passage created in this way, to introduce a filter tube for the vessel, which is connected to the feed and/or discharge line, which is fitted with valve means, for the gas. The grooves or channels may, for example, be arranged helically or in a star shape.

Preferably, the gas flow control system may be formed between the individual conglomerates of carbon nanostructures and/or between these conglomerates and the wall of the storage vessel. This ensures that the compressed gas to be stored is flushed around the carbon nanostructures from all sides, this shortening the storage time and further improving the specific storage capacity.

In a further configuration, the storage vessel or vessels may be connected to a buffer store for the compressed gas. A buffer store of this type contains a certain quantity of compressed gas which can be used for states of high gas consumption which are limited in terms of time. If the storage device is used, for example, in combination with a fuel cell for a vehicle, the compressed gas situated in the buffer store, in particular hydrogen, can be used, for example, when the engine of the vehicle driven by the fuel cell is being accelerated. At these times, an increased quantity of compressed gas is required for a limited time.

Advantageously, the buffer store may be connected to the heating/cooling device. In this case, the compressed gas situated in the buffer store—if it is not required—can also be used to heat or cool the interior of the storage vessel. In this case, an additional heating/cooling medium would be surplus to requirements.

The storage device according to the invention which has been described above may advantageously be used as a storage tank for hydrogen for operating a fuel cell, in particular a fuel cell for operating an engine for a vehicle. In this case, by way of example, applications in the field of passenger automobiles or also in the field of commercial vehicles, such as buses or the like, are conceivable. Naturally, the invention is not restricted to this type of application. By way of example, applications in the computer industry are also conceivable. Particularly in the case of laptops, the power capacity of the batteries has hitherto been limited to only a few hours. This power limit could be increased enormously by the use of fuel cells in combination with a storage device according to the invention as described above. A fuel cell system for use in a laptop is in principle no different from larger systems, for example those used in buses. The only difference lies in the throughput level.

DETAILED DESCRIPTION OF THE PRESENTLY PREFERRED EMBODIMENTS

Figure 1:
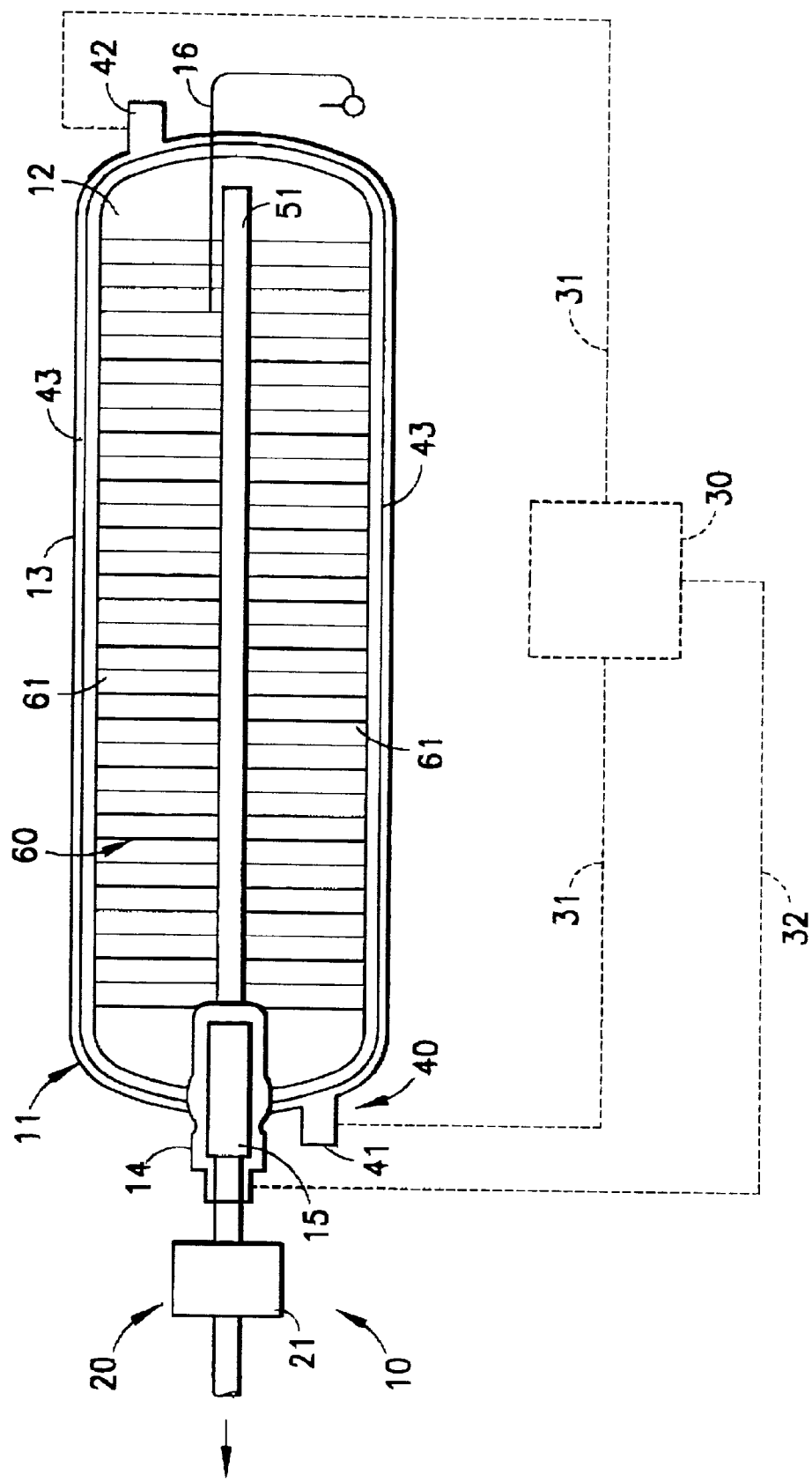
FIG. 1 shows a diagrammatic cross-sectional view of a device according to the invention for storing compressed gas.

FIG. 1 shows a device 10 for storing compressed gas which has a closed storage vessel 11. The storage vessel 11 has a vessel wall 13 which delimits an interior 12 for accommodating a solid filling 60. The storage vessel 11 also has a feed and discharge line 14, via which it can be charged with compressed gas and compressed gas can be discharged. To prevent an undesirable discharge of particles of the solid filling 60 from the storage vessel 11, a filter element 15, which is designed as a microfilter, is provided in the feed and discharge line 14. The temperature in the interior 12 of the storage vessel 11 is determined by means of a temperature sensor 16.

The device 10 for storing compressed gas also has a heating/cooling device 40, which is formed from an inlet connection piece 41, an outlet connection piece 42 and a cooling passage 43. The inlet connection piece 41 and the outlet connection piece 42 are formed in the vessel wall 13 of the storage vessel 11 and are connected to a source for a heating/cooling medium, which is not shown. By way of example, water may be used as a suitable heating/cooling medium. The cooling passage 43, which is situated between an outer wall and an inner wall of the vessel wall 13, which is of multi-walled design, and surrounds the interior 12 in the form of a jacket, is connected to the inlet connection piece 41 and the outlet connection piece 42, so that the heating/cooling medium flows through the cooling passage 43 and therefore contributes to cooling of the storage vessel 11 and its interior 12.

The solid filling 60 situated in the interior 12 of the storage vessel 11 comprises a number of conglomerates 61 of carbon nanostructure material, the conglomerates having an apparent density which is higher than the apparent density of the originally loose particles of the carbon nanostructures. The carbon nanostructures are preferably in the form of carbon nanofibers. These compacted conglomerates 61 of carbon nanostructures increase the specific storage capacity in the storage vessel 11.

The conglomerates 61 of carbon nanostructures have a gas flow control tube 51, which is part of a gas flow control system 50 (FIG. 2), passing through it. The gas flow control tube 51 is connected to the feed and discharge line 14. The compressed gas flowing into the storage vessel 11 is conveyed to the individual conglomerates 61, via the gas supply tube 51, so that it can be stored therein. When the storage vessel 11 is being discharged, the stored compressed gas is transported in the opposite direction, via the gas flow control tube 51, to the feed and discharge line 14. For this purpose, the gas supply tube 51 should be provided with suitable openings in its wall. It is expediently designed as a filter tube, for example consisting of an open-pore sintered metal.

To measure the filling level of the compressed gas in the storage vessel 11, there is a device 20 for measuring the filling level, which in the present exemplary embodiment is designed as a measuring device 21 for measuring the mass flow rate of the compressed gas. The measuring device 21 for measuring the mass flow rate is arranged in the immediate vicinity of the feed and discharge line 14 of the storage vessel. In this way, it is possible to make accurate statements about the filling level of the compressed gas in the storage vessel.

Depending on the particular application, for example if the device 10 for storing compressed gas is used as a tank store for hydrogen for operating a fuel cell for the engine of a motor vehicle, it may be appropriate to additionally provide a buffer store 30 for additional compressed gas. Since it is not absolutely necessary to provide a buffer store 30 of this type, the buffer store 30 and the corresponding lines are illustrated in dashed form in FIG. 1. The buffer store 30 is connected to the feed and discharge line 14 via a line 32. In this way it is possible, for example if the vehicle being driven by the fuel cell is being accelerated, to provide additional compressed gas from the buffer store 30 during the acceleration. According to the exemplary embodiment shown in FIG. 1, the buffer store 30 is also connected, via lines 31, to the inlet connection piece 41 and the outlet connection piece 42 of the heating/cooling device 40. In this way, the compressed gas situated in the buffer store 30 can also be used to heat or cool the storage vessel 11 and/or the solid filling 60 situated therein.

Figure 2:
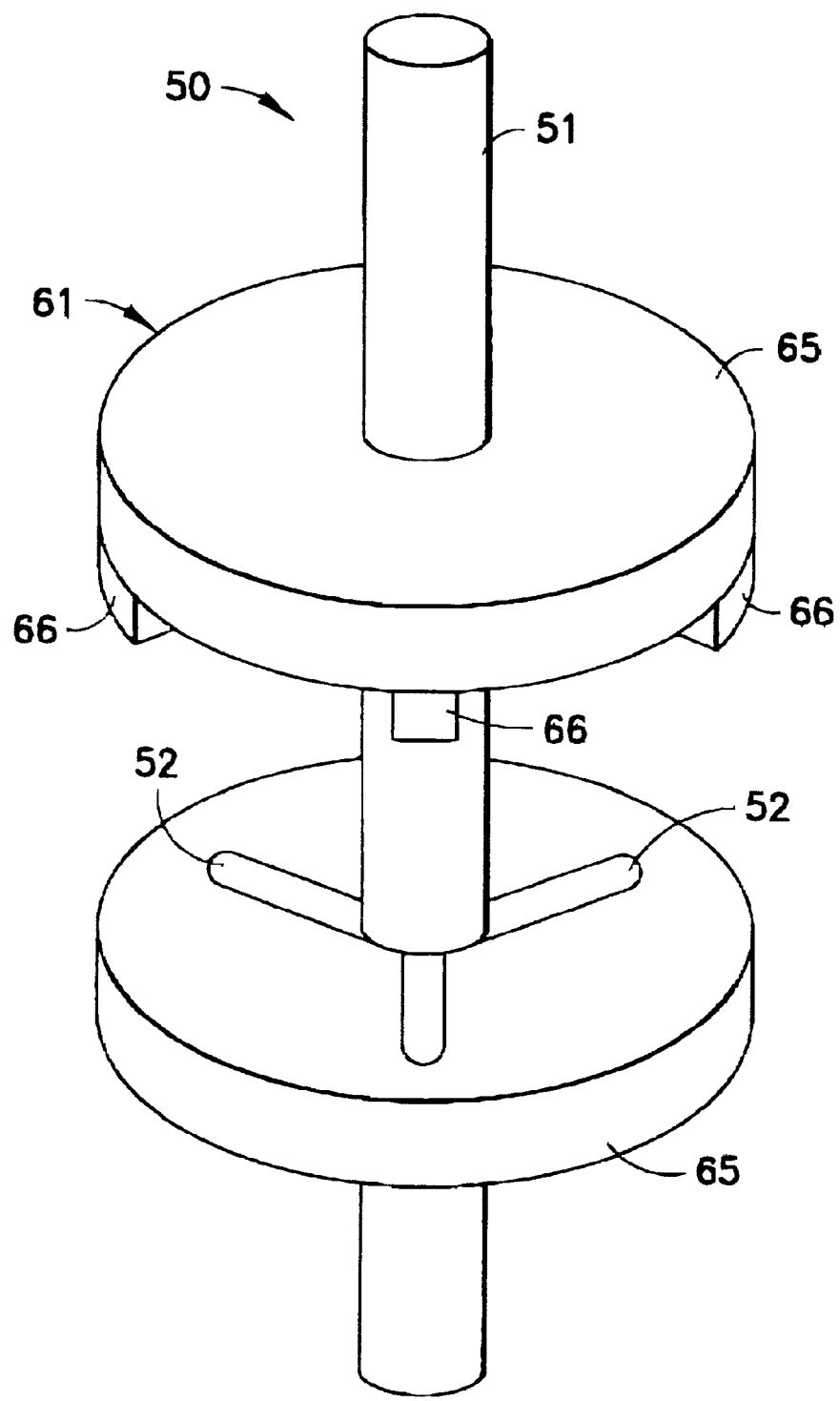
FIG. 2 shows a diagrammatic perspective view of conglomerates of carbon nanostructures in the form of disk-like bodies.

FIG. 2 shows a further embodiment of the solid filling 60, which is in the form of conglomerates 61 of carbon nanostructure material. In this case, the conglomerates 61 are designed as disk-like bodies 65 which are subjected to a pressing operation during their production. The disk-like bodies may—but do not have to—be arranged spaced apart from one another by means of suitable spacers 66. Furthermore, the disk-like bodies 65 may have gas flow control structures 52, which in the lower of the two disk-like bodies illustrated are of star-shaped design. Furthermore, the disk-like bodies 65 have a continuous opening, through which a gas flow control tube 51 is guided, in their center.

The gas flow control tube 51, the gas flow control structures 52 and the spacers 66 form part of the gas flow control system 50, by means of which the compressed gas is brought into communication with the solid filling 60 of carbon nanostructure material. The spacers 66 and the gas flow control structures 52 ensure that the compressed gas is passed simultaneously and uniformly into all regions of the solid filling 60, so that uniform storage of the compressed gas in the storage vessel 11 is achieved. The diameter of the disk-like bodies 65 may be less than or equal to the internal diameter of the storage vessel 11. Particularly if a smaller diameter is selected for the disk-like bodies 65, it is possible to create a further passage between the vessel wall 13 and the edge of the disk-like bodies 65, via which passage the compressed gas can be conveyed in order to be stored in the solid filling 60.

Figure 3:
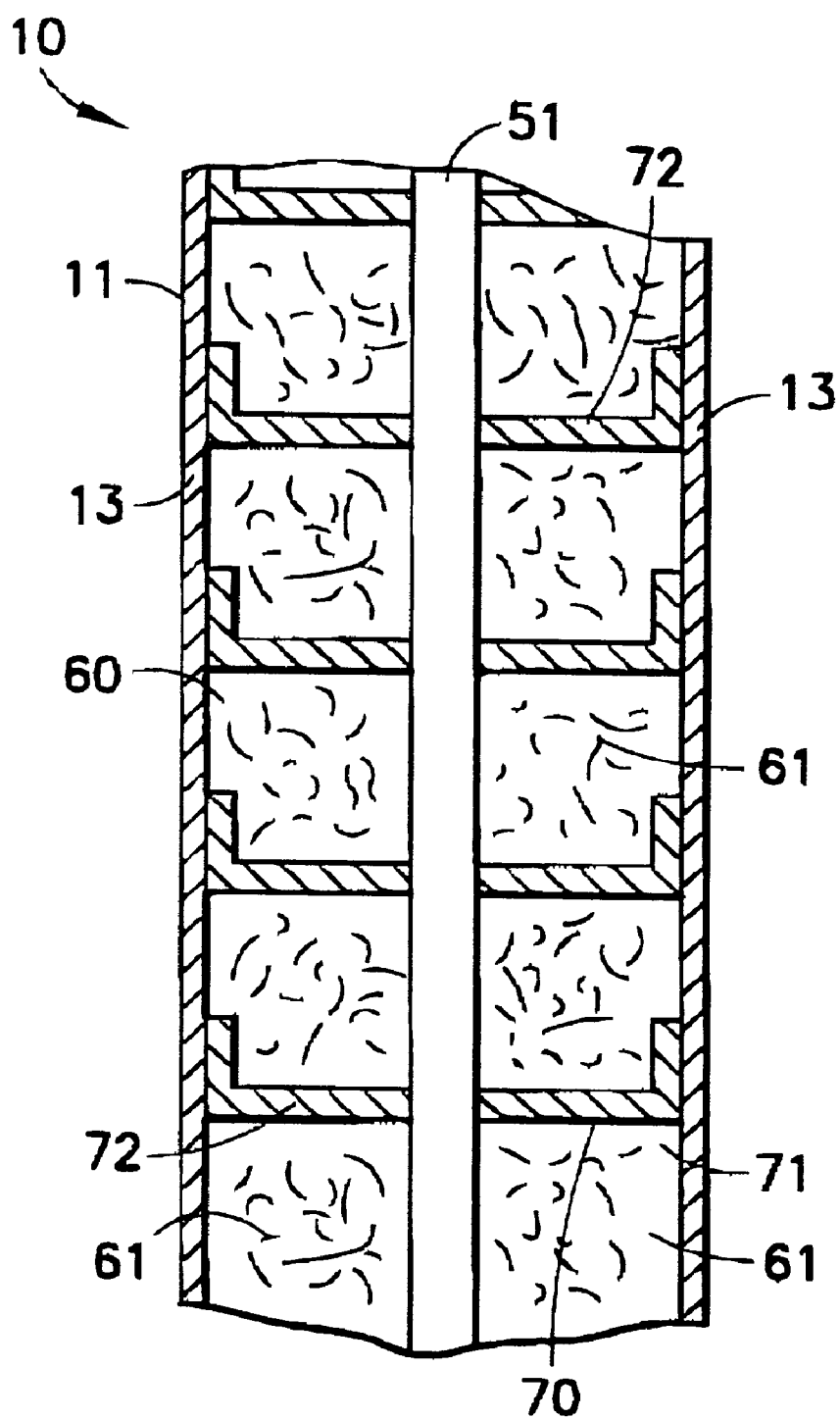
FIG. 3 shows a diagrammatic cross-sectional view of an excerpt from a storage vessel in which a bearing device is provided.

FIG. 3 shows a further embodiment of the device 10 according to the invention for storing compressed gas. A bearing device 70 which has a number of compartments 71 is provided in the interior 12 of the storage vessel 11. The compartments 71 are formed by baffle plates 72 which are spaced apart from one another in the longitudinal direction of the storage vessel 11. In their central region, the baffle plates 72 each have an aperture through which the gas flow control tube 51 is guided. The individual compartments 71 are filled with the solid filling 60, which is formed by conglomerates 61 of carbon nanostructure material. To charge or discharge the storage vessel 11, the compressed gas is introduced into or discharged from the interior 12 of the storage vessel 11 via the gas flow control tube 51. Suitably designing the gas flow control tube 51, for example as a filter tube, ensures that the compressed gas flowing in can in each case flow into the individual compartments 71, where it can be stored in the carbon nanostructures.

Figure 4:
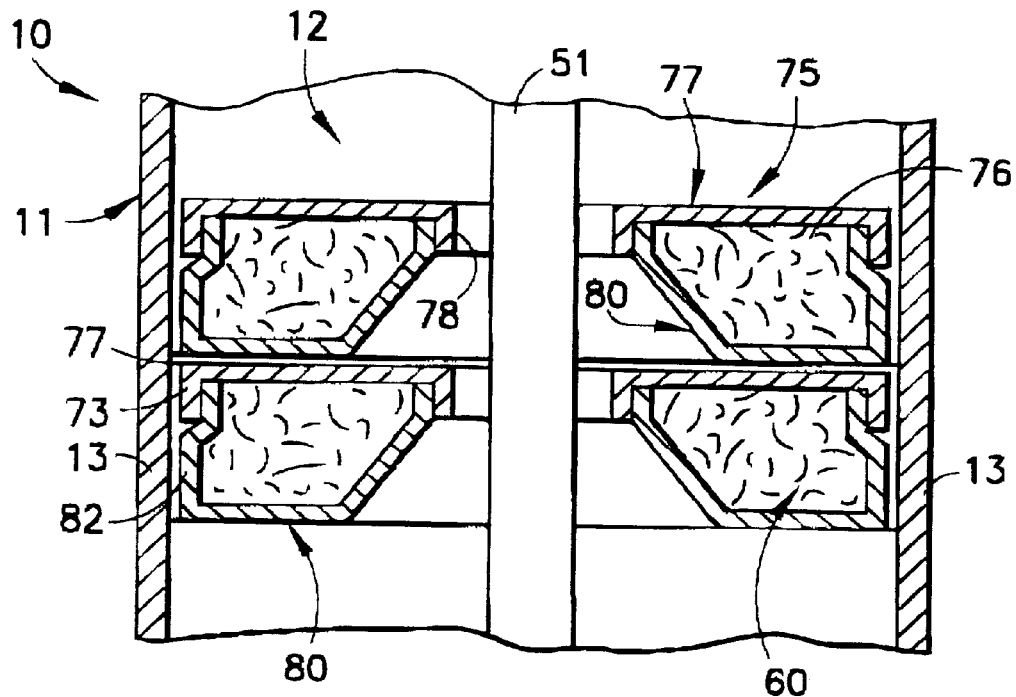
FIG. 4 shows a diagrammatic cross-sectional view of the excerpt of a storage vessel in which a different embodiment of the bearing device is shown, with the state prior to the initial charging of the storage vessel with compressed gas being illustrated.
Figure 5:
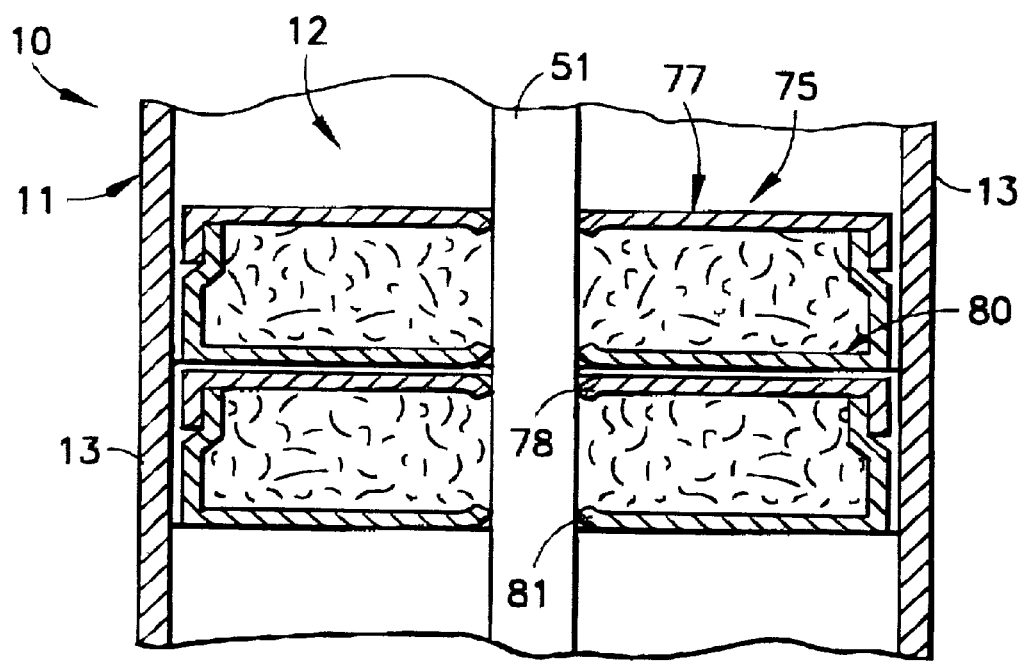
FIG. 5 shows a diagrammatic cross-sectional view of an excerpt of the storage vessel as shown in FIG. 4, with the storage vessel being in a state which results after it has been charged and discharged with compressed gas a number of times.

FIGS. 4 and 5 show a further exemplary embodiment of the device 10 for storing compressed gas.

As can be seen in particular from FIG. 4, inside the storage vessel 11 there is a bearing device 70 which has a number of canisters 75. The canisters 75 each comprise a canister top part 77 and a canister bottom part 80. The canister bottom part 80 has an outer shell 82 and an inner shell 81. The canister top part 77 likewise has an inner shell 78 and an outer shell 79. The outer shell 79 and the inner shell 78 of the canister top part 77 in each case engage over the outer shell 82 and the inner shell 81 of the canister bottom part 80. The inner shell 81 of the canister bottom part 80 has a conical section, or more accurately a section which is in the form of a truncated cone. This design of the canisters 75 ensures that, when the storage vessel 11 is completely filled with the canisters 75, the volume 76 of all the canisters 75 which have been introduced in total is less than the net internal volume of the storage vessel 11. This ensures that the solid filling 60 can expand during the charging and discharging of compressed gas without this causing damage to the storage vessel 11.

If the solid filling 60 comprising carbon nanostructure material expands while it is being charged with compressed gas, the result is a permanent deformation of the canister top part 77 and of the canister bottom part 80. This deformation is illustrated in FIG. 5. It can be seen that those parts of the canisters 75 which lie in the vicinity of the gas flow control tube 51 have stretched out and are bearing tightly against the gas flow control tube 51. It can clearly be seen that this ensures that the solid filling 60, which is distributed in the form of disks, cannot be deposited in an uncontrolled manner between the individual disks. This is an important condition if permanent deformation of the vessel walls 13 of the storage vessel 11 is to be prevented. As a result, the canisters 75 illustrated in FIGS. 4 and 5 can be used both as direct packing for the solid filling 60 and to safely transport the solid filling 60. Furthermore, the canisters 75 are easy to introduce into the bearing device 70, thus allowing rapid fitting of the solid filling 60 in the storage vessel 11.

What is claimed is:

1. A device for storing compressed gas, said device comprising:
    a closed storage vessel having a wall enclosing an interior,
    means for feeding and discharging compressed gas connected to said interior,
    a gas flow control system in said interior, said gas flow control system being connected to the means for feeding and discharging,
    a solid filling for storing compressed gas in the interior, said solid filling comprising carbon nanostructures which are joined to form cohesive conglomerates, at least some of said conglomerates having an apparent density which is higher than the original apparent density of the carbon nanostructures, and
    means for measuring the filling level of the compressed gas in the storage vessel.

2. A device as in claim 1 comprising at least two said storage vessels.

3. A device as in claim 1 wherein said storage vessel is a pressure vessel for storing gases at pressures up to 150 bar.

4. A device as in claim 1 wherein said means for feeding and discharging comprises a feed and discharge line.

5. A device as in claim 1 further comprising at least one filter element in the means for feeding and discharging compressed gas.

6. A device as in claim 1 further comprising means for heating and cooling the interior of the vessel.

7. A device as in claim 6 wherein said means for heating and cooling the interior comprises
    at least one of an inlet connection piece and an outlet connection piece formed in the wall of the storage vessel for a heating/cooling medium, and
    at least one passage for the heating/cooling medium connected to said at least one of an inlet connection piece and an outlet connection piece.

8. A device as in claim 7 wherein said wall of said storage vessel has said at least one passage incorporated therein as a heating/cooling jacket.

9. A device as in claim 1 further comprising at least one temperature sensor arranged inside the solid filling for measuring the temperature in the interior of the storage vessel.

10. A device as in claim 9 wherein said carbon nanostructures are formed from at least one of nanofibers, nanotubes, and nanoshells.

11. A device as in claim 1 wherein the nanostructures have oriented structures.

12. A device as in claim 1 wherein the conglomerates are formed by pressing the carbon nanostructures.

13. A device as in claim 1 wherein said conglomerates are disk-like bodies.

14. A device as in claim 1 wherein said conglomerates are in the form of pellets.

15. A device as in claim 1 further comprising a bearing device arranged in the interior of said storage vessel, said bearing device comprising a plurality of compartments in which said conglomerates are arranged.

16. A device as in claim 15 wherein said bearing device comprises spaced apart baffle plates having said compartments therebetween.

17. A device as in claim 16 wherein two adjacent said baffle plates comprise a top part and a bottom part of a closed cannister, said storage vessel having a plurality of said cannisters in said interior, each said cannister enclosing a volume filled with at least one said conglomerate, the sum of said volumes prior to filling with compressed gas being smaller than the net volume of the interior of the storage vessel.

18. A device as in claim 17 wherein each said top part and each said bottom part comprises an inner shell and an outer shell, said inner shells engaging over one another and said outer shells engaging over one another prior to filling with compressed gas.

19. A device as in claim 1 further comprising a gas permeable matrix in which the carbon nanostructures are embedded.

20. A device as in claim 1 wherein the conglomerates have a cross sectional area which is less than or equal to the cross sectional area of the storage vessel.

21. A device as in claim 1 wherein said means for measuring the filling level of the compressed gas is a device for measuring the nuclear magnetic resonance of the gas in the storage vessel.

22. A device as in claim 1 wherein said means for measuring the filling level of the compressed gas is a device for measuring the mass flow rates of the compressed gas.

23. A device as in claim 22 wherein said device for measuring the mass flow rates of the compressed gas is a device for measuring thermal energy transfer.

24. A device as in claim 1 wherein said means for measuring the filling level of the compressed gas is arranged in at least one of the interior of the storage vessel and the means for feeding and discharging compressed gas.

25. A device as in claim 1 wherein said gas flow control system comprises a gas flow control tube having a wall provided with openings.

26. A device as in claim 25 wherein said gas flow control tube is a filter tube made of open-pore sintered metal.

27. A device as in claim 1 wherein said gas flow control system comprises gas flow control structures which are machined into the conglomerates.

28. A device as in claim 1 wherein said gas flow control system is formed between said conglomerates and at least one of said conglomerates and the wall of the storage vessel.

29. A device as in claim 1 further comprising a buffer store for compressed gas, said buffer store being connected to said storage vessel.

30. A device as in claim 29 further comprising means for heating and cooling the interior of the vessel, said buffer store being connected to said means for heating and cooling.

* * * * *